United States Patent [19]

Furomoto

[11] Patent Number: 4,634,079
[45] Date of Patent: Jan. 6, 1987

[54] FISHING REEL
[75] Inventor: Yoshiyuki Furomoto, Sakai, Japan
[73] Assignee: Shimano Industrial Company Limited, Osaka, Japan
[21] Appl. No.: 752,654
[22] Filed: Jul. 8, 1985
[30] Foreign Application Priority Data Jul. 11, 1984 [JP] Japan .................... 59-105510[U]

[51] Int. Cl.$^4$ ........................................... A01K 89/015
[52] U.S. Cl. ................................. 242/219; 242/84.5 R; 464/67; 464/85
[58] Field of Search ............... 242/84.51 R, 84.5 R, 242/211, 212, 217, 218, 219, 220; 464/67, 69, 85, 87; 74/89.2

[56] References Cited
U.S. PATENT DOCUMENTS

| | | | |
|---|---|---|---|
| 2,274,832 | 3/1942 | Hobbs | 464/85 |
| 2,688,882 | 9/1954 | Alexy | 464/67 |
| 3,021,113 | 2/1962 | Kinnison | 254/374 |
| 4,166,594 | 9/1979 | Kinsey | 242/220 |
| 4,522,354 | 6/1985 | Sato et al. | 242/219 |

Primary Examiner—Billy S. Taylor
Attorney, Agent, or Firm—Stevens, Davis, Miller & Mosher

[57] ABSTRACT

A fishing reel is provided which includes a reel body with a pair of side frames, a spool mounted on a spool shaft disposed between the side frames, a driving shaft rotatably mounted relative to the side frames, a transmission mechanism including a main gear rotatably mounted relative to the driving shaft, a drag mechanism for transmitting an adjustable transmission force to the main gear, and an anti-reverse rotation mechanism including (i) a stopper gear rotatably supported relative to the driving shaft and (ii) a stopper pawl engageable with the stopper gear to prevent reverse rotation of the stopper gear and the spool shaft. A rotary member is mounted on the driving shaft to rotate integrally therewith. The rotary member is disposed in opposed relationship to the stopper gear on the drive shaft. A shock absorber interconnects the stopper gear and the rotary member and includes a biasing member which deflects responsive to reverse rotation of the rotary member to limit reverse rotation of the stopper gear and the spool shaft to an amount corresponding to deflection of the biasing member.

8 Claims, 3 Drawing Figures

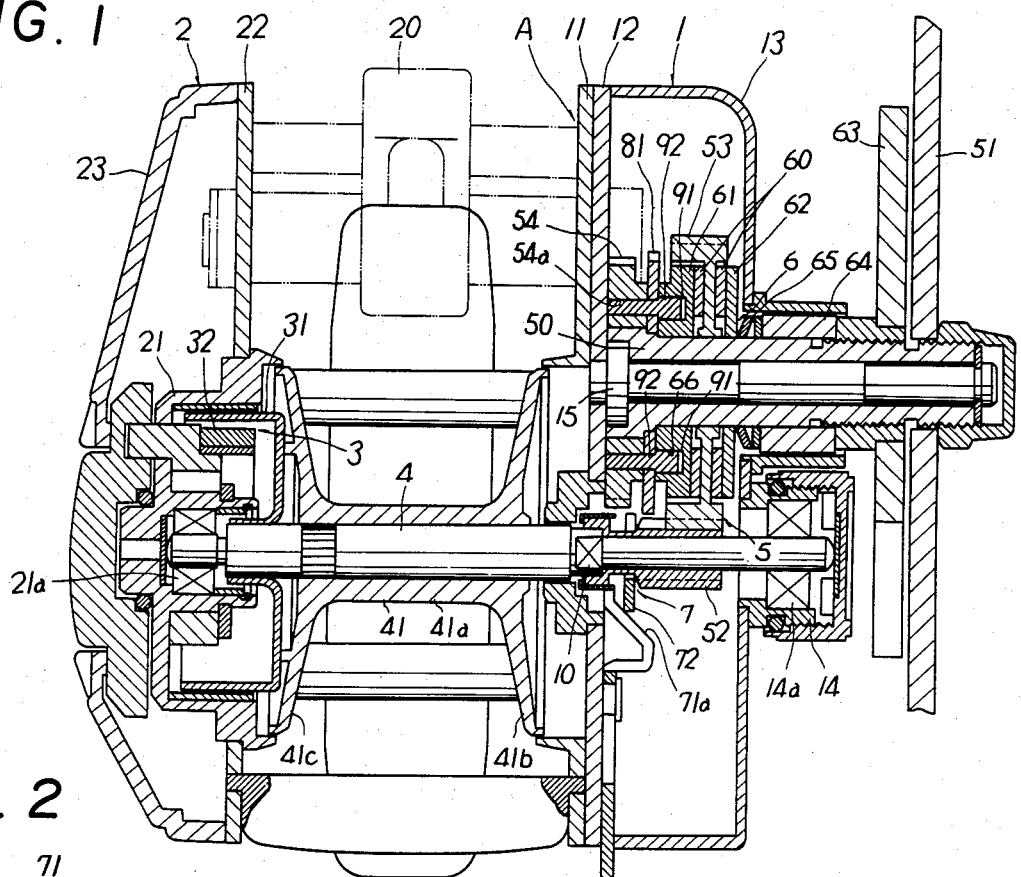
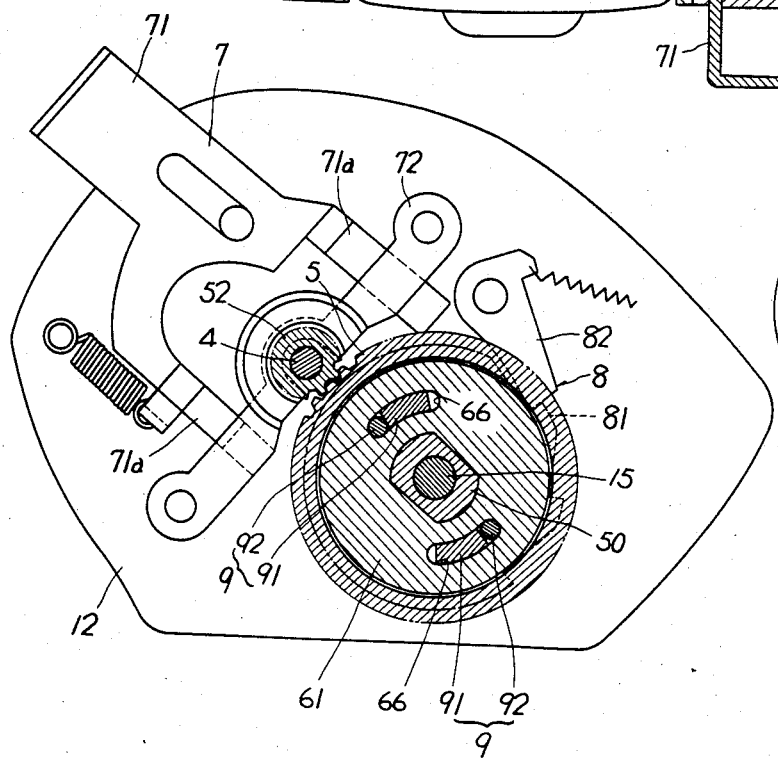
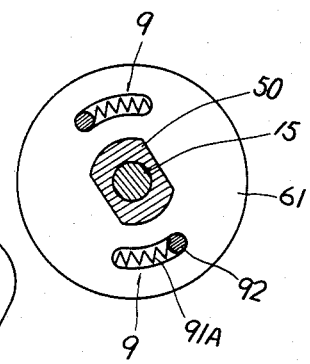
FIG. 1
FIG. 2
FIG. 3

FISHING REEL

FIELD OF THE INVENTION

The invention relates to a fishing reel, and more particularly to a fishing reel wherein a spool shaft carrying a spool is freely rotatably supported on the reel frame, a driving force from a driving shaft is transmitted to the spool shaft through a drag mechanism and a transmission mechanism so as to drive and rotate the spool shaft, and wherein an anti-reverse rotation mechanism is provided comprising a stopper gear and a stopper pawl for preventing reverse rotation of the spool shaft, particularly due to a pull force on the fishing line by a fish.

BACKGROUND OF THE INVENTION

Conventionally, a fishing reel constructed as described above is known as a double-bearing type reel. In detail, such conventional double-bearing reel is provided with a driving shaft, a spool shaft carrying a spool, a transmission mechanism having a main gear for transmitting a driving force from the driving shaft to the spool, a drag mechanism provided between the driving shaft and the main gear, and an anti-reverse rotation mechanism comprising a stopper gear and a stopper pawl engageable therewith for preventing reverse rotation of the stopper gear.

In such reel, the drag mechanism is adapted to adjust a dragging force by use of an adjustment knob or lever so as to prevent a break in the fishing line due to a pull force of a fish. The adjustment of the drag mechanism may be set at, e.g., by mistake or a choice of an angler, a value which overcomes the durability of the fishing line. Thus, in such case, when a hooked fish, which, for example, exerts a pull force overcoming the durability of the fishing line, abruptly pulls the line through such pull force, the line may be subjected to an excessive load overcoming the durability of the line to lead to a break in the line.

To solve this problem, a reel may be employed wherein the spool is supported freely rotatably to a spool shaft and wherein a shock absorber mechanism, which, for example employs a coiled spring, is interposed between the spool and the spool shaft in order to mitigate a shock due to an abrupt pull force on the fishing line by a fish. However, this construction is disadvantageous in that it is complex in comparison with the conventional reel wherein the spool is fixed to the spool shaft. Thus, the aforesaid construction is not satisfactory for solving the above-described problem.

SUMMARY OF THE INVENTION

The present invention utilizes the fact that an anti-reverse rotation mechanism comprising a stopper gear and a stopper pawl has been used in the so-called double-bearing type reel wherein a spool shaft carrying a spool is supported freely rotatably and is driven to rotate through a driving force from a driving shaft. The invention has been designed by employing a construction of a shock absorber mechanism which makes use of the stopper gear. An object of the invention is to provide a fishing reel wherein in the event that a drag mechanism is set at a resistance overcoming the durability of the fishing line, even when a pull force of a hooked fish is abruptly applied to the fishing line, a simple construction mitigates the shock on the line due to the fish's pull force applied to the line and effectively prevents a break in the line.

The fishing reel of the invention comprises a driving shaft, a spool shaft carrying a spool, a transmission mechanism having a main gear for transmitting a driving force from the driving shaft to the spool shaft to drive the same, a drag mechanism provided between the driving shaft and the main gear, and an anti-reverse rotation mechanism for preventing reverse rotation of the spool shaft, with the anti-reverse rotation mechanism having a stopper gear and a stopper pawl engageable therewith for preventing reverse rotation of the stopper gear. The fishing reel of the present invention is characterized in that the stopper gear is supported to the driving shaft freely rotatably with respect thereto; at the driving shaft is fixedly or integrally provided a rotary member which is opposite to the stopper gear and which rotates integrally with the driving shaft; between the stopper gear and the rotary member is provided a shock absorber mechanism having a biasing means which deflects corresponding to the rotary member's rotation in a reverse direction.

The biasing means of the shock absorber mechanism employs an elastic member, preferably e.g., a rubber member, or a coiled spring, etc. The biasing means is typically so constructed that one of the stopper gear and the rotary member is formed with an elongate bore in an arcuate shape around an axis of the driving shaft, and the other is provided with a protuberance insertable into the elongate bore, and the above-described elastic member is interposed between the protuberance and a longitudinal end portion of the elongate bore.

Conventionally, where a dragging force to be applied to the main gear by the drag mechanism is set at a valve greater than the durability of the fishing line to be used and wound onto the spool, when the fishing line is abruptly subjected to an excessive pull force overcoming the durability of the line, the line is broken due to a shock from such abrupt excessive pull force. However, the invention provides that the aforesaid shock is mitigated by the shock absorber mechanism, thereby preventing a break in the fishing line.

Additionally, the invention employs for the shock absorber mechanism the stopper gear of the anti-reverse rotation mechanism, thereby maintaining the simple construction of the reel and avoiding any increase in size of the reel as a whole resulting from incorporation of the shock absorber mechanism.

These and other objects of the invention will be made more apparent by the following description take in conjunction with the attached drawings.

BRIEF DESCRIPTION OF THE DRAWINGS

FIG. 1 is a sectional plan view showing an embodiment of a fishing reel of the invention, FIG. 2 is a partially omitted longitudinal sectional side view of the reel of FIG. 1, and FIG. 3 is a partial sectional view of a modified embodiment illustrated in correspondence with FIG. 2.

DETAILED DESCRIPTION OF THE INVENTION

In FIG. 1, reference numeral A designates a reel body comprising a pair of first and second side frames 1, 2 opposite to each other and spaced apart a predetermined amount. The first side frame 1 comprises a side plate 11, an attached plate 12 attached to the outside of the side plate 11, and a cup-shaped cover 13 having a bearing cylinder 14 at its center and attached to the outside of the attached plate 12. The second side frame 2 comprises a side plate 22 having a bearing housing 21 at its center and a cup-shaped cover 23 attached to the outside of the side plate 22. Bearing housing 21 houses a magnet brake 3 comprising an electric conductor 31 and a magnet 32 opposite thereto.

Each of bearings 14a and 21a is provided at the bearing cylinder 14 and bearing housing 21 respectively of the first and second side frames 1, 2 constructed as described above. A spool shaft 4 having a spool 41 is supported freely rotatably between the bearings 14a and 21a.

The spool 41 is provided with a cylindrical trunk 41a and a pair of flanges 41b, 41c extending radially outwardly at both longitudinal ends of the trunk 41a, and is fixed to the spool shaft 4, preferably by press-fitting means.

To the attached plate 12 of first side frame 1 is fixed a support shaft 15 passing through the cover 13 and projecting outwardly. A cylindrical driving shaft 50 is freely rotatably supported to the support shaft 15, and a handle 51 is supported to a projecting shaft portion of the driving shaft 50. This projecting shaft portion extends outwardly of the first side frame 1. A driving force resulting from rotation of the handle 51 is transmitted to the spool shaft 4 from the driving shaft 50 through a drag mechanism 6, transmission mechanism 5, and a clutch 10 operated by a clutch lever 71 of clutch operating mechanism 7, described in detail below, to drive spool 41.

An anti-reverse rotation mechanism 8 comprising a stopper gear 81 and a stopper pawl 82 is provided between the driving shaft 50 and the first side frame 1, so that the driving shaft 50 can be prevented from undergoing reverse rotation which would be caused by a transmission from the spool shaft 4 when the clutch 10 is in engagement.

The clutch 10 is so constructed that the spool shaft 4 is formed at its intermediate portion with a flat surface and a pinion gear 52 is formed with a tubular portion having a non-round inner surface engageable with the flat surface at the spool shaft. Pinion gear 52 is rotatably slidably supported to the spool shaft 4, so that the tubular portion of pinion gear 52 is disengaged from the flat surface portion of the spool shaft 4 through a forward movement of the clutch lever 71, thereby enabling the spool shaft 4 and the spool 41 fixed thereto to be freely rotatable.

The transmission mechanism 5 comprises the pinion gear 52 and a main gear 53 supported freely rotatably to a projecting portion of the driving shaft 50. This projecting portion extends into the first side frame 1. Main gear 53 engages with the pinion gear 52. A driving force due to a rotation operation of the handle 51 is transmitted from the driving shaft 50, through the drag mechanism 6, to the main gear 53, then further transmitted therefrom to the spool shaft 4 through the pinion gear 52 and the clutch 10 provided therebetween, thereby driving the spool 41.

The drag mechanisms 6 comprises friction plates 60, a pair of first and second drag washers 61, 62 supported on the driving shaft 50 at both axial sides of the main gear 53, a drag lever 63 interposed between the second drag washer 62 and the handle 51, and a washer 64 and leaf spring 65 each interposed between the drag lever 63 and the second drag washer 62. The first and second drag washers 61, 62 are supported on the driving shaft 50 non-rotatably but axially movably relative thereto. The drag lever 63 is screwed with the driving shaft 50, so that the drag lever 63 is rotated in operation to axially move the second drag washer 62 to thereby press the friction plates 60 between the first and second drag washers 61, 62. This enables a driving force to be transmitted from the driving shaft 50 to the main gear 53 through the second drag washer 62 and friction plate 60, and also enables the main gear 53 to rotate slidably with respect to the driving shaft 50 when a pressing force of the friction plates 60 through the drag lever 63 is decreased to a relatively low magnitude.

The clutch operating mechanism 7 comprises a clutch yoke 72 which holds the pinion gear 52 to always bias it in a direction of engaging the clutch 10 and a fork-shaped clutch lever 71 which has a pushing portion 71a for pushing the clutch yoke 72. Clutch lever 71 is supported to the attached plate 12 movably in such that it can reciprocate in a perpendicular direction to the spool shaft 4. Clutch lever 71 is operated in forward movement to move the clutch yoke 72 axially to thereby move the pinion gear 52 in a direction of disengaging the clutch 10, and the clutch lever 71 is operated in backward movement to move the pinion gear 52, through a pushing force of the clutch yoke 72, in the direction of engaging the clutch 10.

In the reel constructed as abovesaid wherein the drag mechanism 6 is provided between the driving shaft 50 and the main gear 53 and there is provided the anti-reverse rotation mechanism 8, the reel of this invention provides an improvement wherein stopper gear 81 is supported freely rotatably with respect to the driving shaft 50, and between the stopper gear 81 and a rotary member, e.g., drag washer 61 in the embodiment illustrated in the drawings, which is rotatable integrally with the driving shaft 50 is provided a shock absorber mechanism 9 having a biasing means, such as rubber or spring, etc., which deflects due to the rotary member's rotation in a reverse direction.

In the embodiment shown in FIGS. 1 and 2, the stopper gear 81 is arranged between the first drag washer 61 and the attached plate 12 and is supported freely rotatably to the driving shaft 50. The stopper pawl 82 is pivoted to the attached plate 12 and is always meshed with the stopper gear 81 due to a spring bias. Also, the first drag washer 61 is provided at its face opposite to the stopper gear 81 with at least one elongate bore 66 having an arcuate shape around an axis of the driving shaft 50. A biasing means comprising a rubber member 91 having a substantially square cross section is held in the elongate bore 66. At the stopper gear 81 is provided at least one stopper pin 92 which projects therefrom and is fitted into the elongate bore 66. The rubber member 91 and the stopper pin 92 constitute the shock absorber mechanism 9 which functions so that when the first drag washer 61 is rotated in a reverse direction, the rubber member 91 deflects a predetermined amount to thereby mitigate any shock applied to a fishing line wound onto the spool 41.

The biasing means may alternatively employ an elastic member 91A, such as a coiled spring shown in FIG. 3, instead of rubber member 91, and is not particularly limited in its construction. In other words, the biasing means can make use of materials or constructions which deflect due to the rotary member's rotation in a reverse direction, which rotary member rotates integrally with the driving shaft 50.

The rotary member comprises first drag washer 61 in the above-described embodiment and may alternatively employ a holding member which is separate from the drag washer 61, which holds the biasing means, and which is supported to the driving shaft 50 non-rotatably with respect thereto.

In FIG. 1, reference numeral 54 designates a transmission gear for transmitting a driving force from the driving shaft 50 to a fishing line guide 20. The transmission gear 54 is supported freely rotatably to the driving shaft 50 and is provided with a fitting bore 54a for receiving an end portion of the stopper pin 92, so that the driving force of the driving shaft 50 can be transmitted to the transmission gear 54 through the first drag washer 61 and the stopper pin 92.

Upon making a casting operation with the reel of the present invention constructed as described above, first, the clutch lever 71 is moved forward to disconnect the clutch 10 as described above to thereby bring the spool 41 into a free rotation mode. Then, casting is performed to throw a fishing line wound on the spool 41.

Thereafter, the clutch lever 71 is moved backward to its initial position to thereby connect the clutch 10 and bring the reel into a fishing line wind-up mode. The angler then waits for a fish to bite. In this fishing line wind-up mode, the driving shaft 50 is prevented from undergoing reverse rotation by the meshing of the stopper gear 81 with the stopper pawl 82; i.e., driving shaft 50 is not permitted to undergo reverse rotation to an extent greater than a rotation amount allowed by the shock absorber mechanism 9.

Upon winding up of the fishing line, a driving force from a rotation operation of the handle 51 is transmitted from the driving shaft 50 to the spool shaft 4 through the drag mechanism 6, main gear 53, pinion gear 52 and clutch 10, thereby driving the spool 41 and winding up the fishing line thereon.

In this fishing line wind-up mode, when a fish is hooked to cause the line to be subjected to a tension due to a pull force of the hooked fish, the tension at the line applies to the spool 41 a force in a direction tending to cause spool 41 to rotate in reverse. This force is applied from the spool 41 to the first and second drag washers 61, 62 through the spool shaft 4, clutch 10, pinion gear 52, main gear 53 and friction plates 60, so that the rubber member 91 held at the first drag washer 61 is biased toward the stopper pin 92 provided at the stopper gear 81 to thereby deflect. As a result, main gear 53, drag mechanism 6 and driving shaft 50, which are directly connected at this point with one another, are rotated reversely with respect to the stopper gear 81 in an amount corresponding to the deflection of the rubber member 91. Therefore, a shock due to the pull force of the hooked fish can be mitigated to prevent a break in the fishing line due to the pull action of the fish.

In the above-described embodiment, the biasing means is provided at the rotary member, for example, a drag washer 61, integrally rotatable with the driving shaft 50, and the stopper pin 92 is provided at the stopper gear 81. However, alternatively, the arrangement positions of such biasing means and stopper pin may be reversed.

A means for deflecting the biasing means employs a stopper pin 92 in the above-described embodiment but is not particularly limited in construction.

Also, stopper gear 81, which is supported freely rotatably to the driving shaft 50, may be restrained to rotate only in a given range of rotation.

As seen from the above, the invention can prevent a break in the fishing line due to a pull force of a hooked fish. Additionally, a very effective prevention of a break in the fishing line can be performed by such simple construction that there are employed a stopper gear at an anti-reverse rotation mechanism and a rotary member such as a drag washer integrally rotatable with a driving shaft, with the stopper gear being freely rotatably supported to the driving shaft, and a shock absorber mechanism being provided between the stopper gear and the rotary member, the shock absorber mechanism having a biasing means which deflects due to the rotary member's rotation in reverse direction.

Furthermore, the invention can make use of a conventional construction wherein the spool is fixed to the spool shaft, so that the shock absorber mechanism even when incorporated in the reel will not enlarge the size of the reel as a whole. A fishing reel according to the invention which includes a shock absorber mechanism as described above requires a minimum increase of cost to produce.

It is to be understood that modifications and variations may be made to the invention without departing from the spirit and scope thereof, as those skilled in the art will readily understand. Accordingly, the invention is not limited by the foregoing description, but only by the appended claims.

What is claimed is:

1. A fishing reel, comprising:
    a driving shaft,
    a spool shaft supporting a spool,
    a transmission mechanism coupling said driving shaft with said spool shaft and having a main gear rotatably mounted relative to said driving shaft for transmitting a driving force of said driving shaft to said spool shaft to drive said spool shaft,
    a drag mechanism, responsive to said driving force from said driving shaft, for transmitting an adjustable transmission force to said main gear,
    an anti-reverse rotation mechanism including a stopper gear rotatably supported relative to said driving shaft and a stopper pawl engageable with said stopper gear to prevent reverse rotation of said stopper gear and said spool shaft,
    a rotary member mounted on said driving shaft to rotate integrally therewith, said rotary member being disposed in opposed relationship to said stopper gear on said driving shaft, and
    a shock absorber means interposed between said stopper gear and said rotary member, said shock absorber means having a biasing means which deflects responsive to reverse rotation of said rotary member.

2. A fishing reel according to claim 1, wherein one of said stopper gear and said rotary member includes at least one elongate bore having an arcuate shape substantially centered around an axis of said driving shaft, the other of said stopper gear and said rotary member has at least one protuberant member inserted in said elongate bore, and wherein said biasing means is interposed between said protuberant member and a longitudinal end of said elongate bore.

3. A fishing reel according to claim 2, wherein said biasing means is a rubber member.

4. A fishing reel according to claim 2, wherein said biasing means is a coiled spring.

5. A fishing reel, comprising:
    a reel body with a pair of side frames, a spool mounted on a spool shaft disposed between said side frames, a driving shaft rotatably mounted relative to said side frames, a transmission mechanism, including a main gear rotatably mounted relative to said driving shaft, for transmitting a driving force from said driving shaft to said spool shaft to drive said spool shaft, a drag mechanism, responsive to said driving force from said drive shaft, for transmitting an adjustable transmission force to said main gear, an anti-reverse rotation mechanism including a stopper gear rotatably supported relative to said driving shaft and a stopper pawl engageable with said stopper gear to prevent reverse rotation of said stopper gear and said spool shaft, a rotary member mounted on said driving shaft to rotate integrally therewith, said rotary member being disposed in opposed relationship to said stopper gear on said driving shaft, and a shock absorber means interconnecting said stopper gear and said rotary member, said shock absorber means comprising a biasing means which deflects responsive to reverse rotation of said rotary member to limit reverse rotation of said stopper gear and said spool shaft to an amount corresponding to deflection of said biasing means.

6. A fishing reel according to claim 5, wherein one of said stopper gear and said rotary member includes at least one elongate bore having an arcuate shape substantially centered around an axis of said driving shaft, the other of said stopper gear and said rotary member includes at least one protuberant member inserted in said elongate bore, and said biasing means is interposed between said protuberant member and a longitudinal end of said elongate bore.

7. A fishing reel according to claim 6, wherein said biasing means is a rubber member.

8. A fishing reel according to claim 6, wherein said biasing means is a coiled spring.

* * * * *